(12) United States Patent
Yosefi (10) Patent No.: US 6,509,903 B1
(45) Date of Patent: Jan. 21, 2003

(54) SYSTEM AND METHOD FOR RECORDING AN IMAGE

(75) Inventor: Hanan Yosefi, Ganei Tikva (IL)

(73) Assignee: Creoscitex Corporation Ltd., Herzlia (IT)

( * ) Notice: Subject to any disclaimer, the term of this patent is extended or adjusted under 35 U.S.C. 154(b) by 0 days.

(21) Appl. No.: 09/413,404

(22) Filed: Oct. 6, 1999

(51) Int. Cl.$^7$ ................................. G06T 11/40
(52) U.S. Cl. .............. 345/597; 358/3.06; 358/3.2; 358/3.27
(58) Field of Search ................... 345/431, 589, 345/596, 597, 598, 599; 382/162, 163, 164, 165, 166, 167; 358/3.06, 3.2, 3.27

(56) References Cited

U.S. PATENT DOCUMENTS

| | | |
|---|---|---|
| 5,113,249 A | 5/1992 | Yosefi |
| 5,323,248 A | 6/1994 | Yosefi |
| 5,420,702 A | 5/1995 | Yosefi |
| 5,481,379 A * | 1/1996 | Yosefi ................ 358/501 |
| 5,691,828 A | 11/1997 | Weiss et al. |
| 5,699,174 A | 12/1997 | Weiss et al. |
| 5,742,743 A * | 4/1998 | Weiss ................ 395/109 |
| 6,262,747 B1 | 7/2001 | Rocheleau et al. ..... 345/434 |
| 6,345,117 B2 * | 2/2002 | Klassen ............... 382/167 |

FOREIGN PATENT DOCUMENTS

EP          0840500 A2          5/1998

* cited by examiner

Primary Examiner—Jeffery Brier
Assistant Examiner—G. F. Cunningham
(74) Attorney, Agent, or Firm—Eitan, Pearl, Latzer & Cohen-Zedek (57) ABSTRACT

A two-stage method for recording a quality enhanced image on a substrate has a preparation and a production stage. In the preparation stage, the digital image file is scanned for adjacent color pairs with different color values. This exhaustive list is processed according to predetermined criteria per type of output device, creating a sub-list of color pairs that might potentially create artifacts on the recorded image. Several such sub-lists may be created, each per potential output technology to be used. Each sub-list of color pairs is accompanied by modification parameters, indicating the action that needs to be taken in the recording stage, in order to avoid the artifacts and thereby enhance the recorded image quality. In the second, Production stage, this enhancement information, prepared for the actual output device to be used, is used to modify the imaging parameters such as screening parameters, taking into consideration production information such as enlargement.

24 Claims, 7 Drawing Sheets

FIG. 9

SYSTEM AND METHOD FOR RECORDING AN IMAGE

FIELD OF THE INVENTION

The present invention relates to systems and methods for producing halftone images from digital representations of color images, the image to be recorded as latent or visible images by an output device such as image-setter, plate-setter or a digital printer.

GLOSSARY OF TERMS

Trapping—creating an overlap (trap/frame) between abutting colors to compensate for imperfections of the printing press.

Anti-aliasing—eliminating visibly jagged steps along angles or object edges, created by sharp tonal contrasts between adjacent color areas.

Screening—creating a pattern of dots to reproduce color or grayscale continuous-tone images.

Xerography—An electrostatic non-impact printing process in which heat fuses dry ink toner particles to electrically charged areas of the substrate, forming a permanent image.

BACKGROUND OF THE INVENTION

In the graphic arts industry, a half tone image, representing the image to be printed as a latent or a visible image, is produced from a digital representation of the image. This digital representation is produced in a workflow that includes two major stages.

In the first stage, performed using an image editing computer, such as a Macintosh, available from Apple Computer Inc. of Cupertino, Calif. and equipped with image-editing software, such as Adobe PhotoShop, available from Adobe Systems Inc. of San Jose, Calif., digital images to be recorded are created and edited by a graphic arts designer. This image editing usually includes one or more page-element specific operations, such as manipulating the colors of an image and preparing a page layout incorporating all the defined page elements in a Page Description Language (PDL).

In the second stage, a series of processes are applied to the input PDL file, resulting in a halftone image to be recorded by a digital front-end (DFE) application. The DFE may be connected to one or more output devices.

Figure 1:
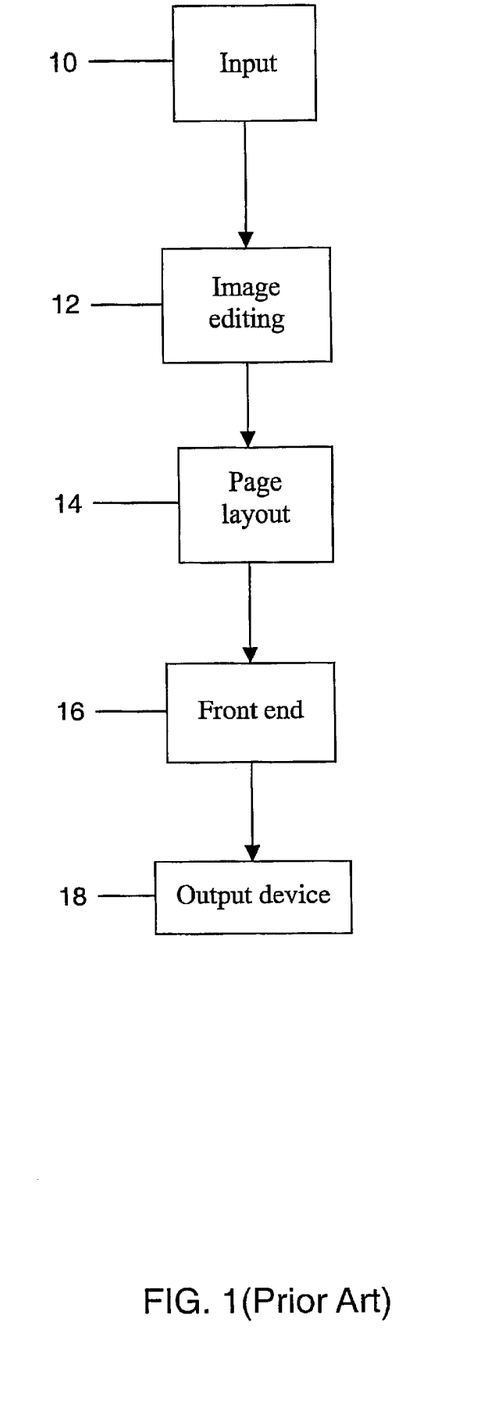
FIG. 1 is a schematic block diagram of a prior-art pre-press to press workflow.

FIG. 1 schematically outlines a typical prior-art pre-press to press system, in which an analog picture is scanned (step 10) using a scanner such as the Smart 342, commercially available from Scitex Corporation Ltd. of Herzlia, Israel. This produces a digital representation of the original. The digital file is then edited by the designer in step 12, using software applications such as Adobe PhotoShop, and a page is constructed in step 14, using software applications such as Adobe PageMaker, both available from Adobe Systems Inc. of San Jose, Calif., for color editing and page layout, respectively. The resulting digital representation of a page is converted to a standard file format, such as PostScript, PDF or other page description language.

The standard file is used as an input digital representation to a front-end system 16, connected to an output device 18 that may be an image-setter, a plate-setter, a xerographic digital printer or any other known device for printing. The front-end system such as the Brisque, commercially available from Scitex, produces a half tone image from the input digital representation, after a series of operations, i.e., raster image processing, trapping, anti-aliasing and screening.

Figure 2:
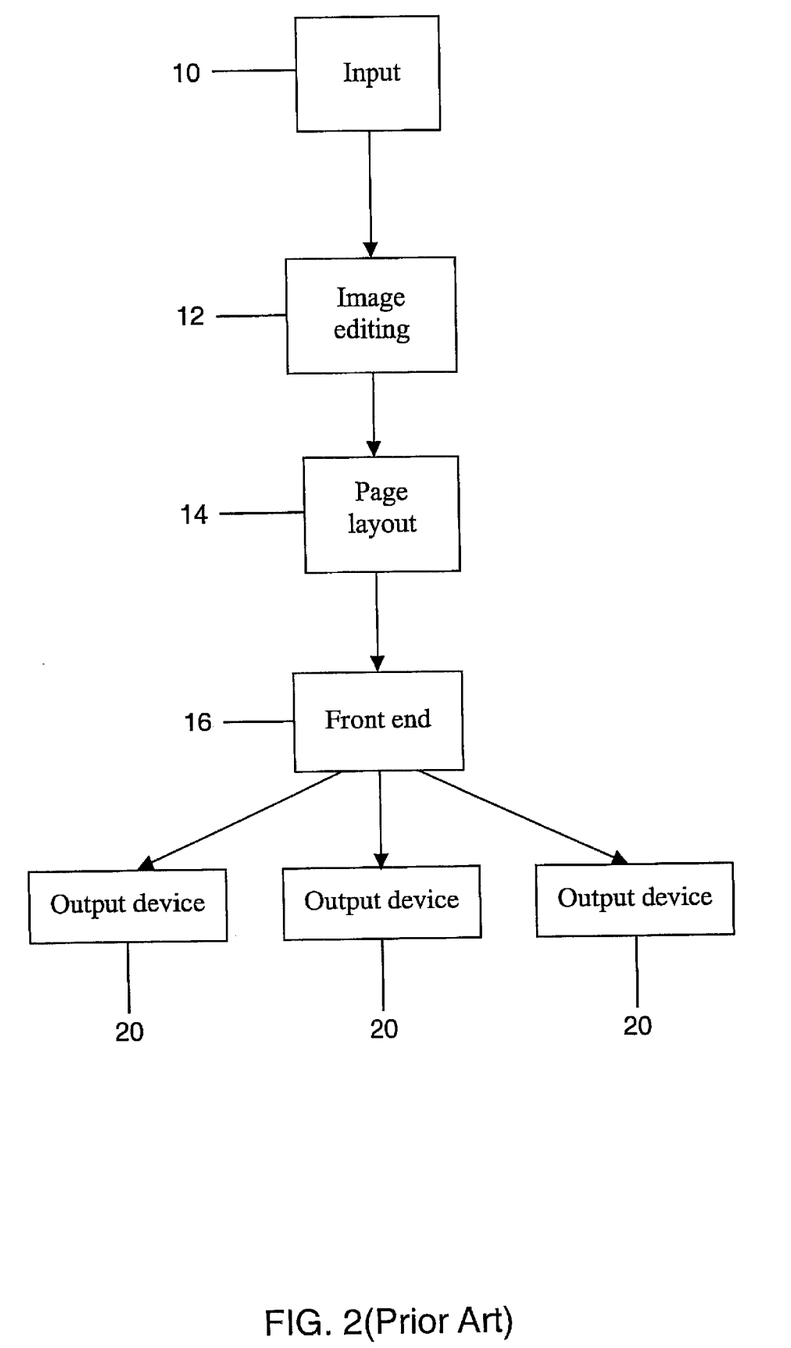
FIG. 2 is a schematic block diagram of a prior-art multi-output device pre-press to press flow scheme.

FIG. 2 schematically outlines a similar system, with the same basic flow, where the front-end system is connected to several output devices 20 in parallel.

In the prior art configurations of FIGS. 1 and 2, the decision of when and where in the process to perform the second stage operations such as trapping, anti-aliasing and screening is insignificant, Each of the second stage processes requires the page description file as input, as well as precise knowledge of the output device's characteristics and can be performed anywhere in time, between the page layout stage and the imaging or printing stage.

In one state of the art workflow used by Scitex, the digital page file is rasterized first, to create an intermediate file. The intermediate file goes through an automatic trapping application, such as Full Auto Frame available from Scitex, which automatically analyzes, decides and creates traps where desired, to produce a trapped intermediate file which is then screened. In this workflow, screening is performed in the front-end system, by applications such as Scitex Class Screen or Scitex Turbo Screen, operating on a digital file that has already been trapped.

In another state of the art workflow, trapping is done during rasterization, such as in the In-RIP Trapping application, available from Adobe Systems Inc. of San Jose, Calif. In this workflow, one can define trapping parameters prior to the RIP, to be executed during the RIP process.

In yet another workflow, the trapping functionality is found within the QuarkXpress application, available from Quark Inc. of Denver, Colo. and is performed before conversion of the digital image to a standard page description language file.

There are yet other ways to process the file provided to the front end in a standard file format. Most of them do not take into account the effect that any specific image processing operation might have on the outcome of subsequent image processing operations, in conjunction with a specific output device. For example, the trapping process often results in narrow color areas (trap areas) between specific color combinations of adjacent colors. These tap areas, when imaged by a specific output device, are very sensitive to the imaging capabilities of the output device, in terms of various parameters, including screen resolution, dot size, angle and shape, as well as the actual width of the trap. All of these parameters depend on the type of device that will produce the visible image.

The existing methods for pre-analyzing a file for possible imperfections in printing (resulting from the data of the file and the characteristics of the specific printing device), usually try to prevent those imperfections by modifying the digital data prior to printing, thereby possibly introducing artifacts into the file, enlarging its storage size and creating device-dependency which reduces the flexibility to produce the file on other types of devices, or with different output parameters (i.e. different size, resolution etc.) on the same device.

In general, image processing performed on an image file can produce different results on different output devices, depending on the characteristics of the output device. Thus, in the prior art, the parameters of the specific output device have been used as constraints to the image processing algorithms in order to achieve quality and predictability of output. On the other hand, processing that considers the parameters of a specific output device is less general and requires that the processing be performed separately for each output device.

European Patent Publication EP 0840500 A2 to Adobe Systems deals with the problem of output device dependency by suggesting a method for device independent trapping. According to EP 0840500 A2, the entire trapping algorithm is performed independent of the specific output device, leaving only the determination of the actual trap color to the final printing stage, This solution deals only with the appearance of the trap color and does not address other quality issues as described above.

SUMMARY OF THE INVENTION

The present invention provides a workflow for producing improved half tone images to be recorded as latent or visible images by an output device connected to a front-end system.

It is an object of the present invention to provide a workflow divided into two stages; the "preparation stage", which is output device independent and results in a set of parameters, and the "production stage", which involves the actual creation of the visible or latent image on a specific output device, using the parameters created by the preparation stage.

In one aspect, the present invention provides a method for enhancing the quality of a digital halftone image recorded on a substrate:

Initially, at least one color pair comprising two adjacent colors is identified in the digital image data, where there is a difference in color value between said two adjacent color areas in at least one separation of the digital image.

Next, for at least one of the identified pairs, a determination is made whether quality enhancement is desired, based on predetermined criteria which might or might not depend on a specific output device to be used.

Wherever quality enhancement is desired, imaging parameters for modifying the digital image data in the border area between the two adjacent color areas are prepared, based on the previous determination.

During recording, the thus prepared imaging parameters are used to modify the digital image data in the border area between the two adjacent color areas, thereby enhancing the quality of the recorded half tone image.

In another aspect, the present invention provides a method for analyzing a digital image for potential artifacts in the recorded image, by identifying, in the digital image, at least one color pair having two adjacent colors, where there is a difference in color value between the two adjacent color areas in at least one separation of the image. This analysis is performed only once, in a device independent manner.

In yet another aspect, the present invention provides a method for determining, for at least one pair of adjacent colors having a difference in color value in at least one separation, whether quality enhancement is desired, and repeating this determining step once for each potential output device to be used.

In yet another aspect, the present invention provides a method for determining, for at least one pair of adjacent colors having a difference in color value in at least one separation, whether quality enhancement is desired, and specifying the type of quality enhancement for that color pair.

In yet another aspect, the present invention provides a method for modifying imaging parameters of previously indicated adjacent color areas, where the step of modifying may or may not depend on the specific output device to be used.

In yet another aspect, the present invention provides a method for modifying screening parameters, including halftone-dot rotation angle and/or screen resolution, to enhance the quality of an image to be recorded.

In yet another aspect, the present invention provides a method for enhancing the quality of an image to be recorded by a xerographic printer, by decreasing the screen resolution parameter for the border area between two adjacent color areas, to prevent leading edge deletion and/or trailing edge deletion.

In yet another aspect, the present invention provides a method for enhancing the quality of an image to be recorded by an image-setter for subsequent printing on an offset press or by a xerographic printer, by changing the halftone-dot rotation angle parameter for the border area between two adjacent color areas, to prevent jagged edges in the trapping area.

Another aspect of the present invention is to provide a method for preparing information for recording a digital quality enhanced half tone image on a substrate:

Initially, at least one color pair having two adjacent colors, where there is a difference in color value between the two adjacent color areas in at least one separation of the image, is identified in the digital image.

Next, a determination is made, for at least one pair of the at least one color pair, whether quality enhancement is desired, based on pre-determined criteria which may or may not be output device dependent.

Following the determination, imaging parameters are prepared for modifying the image data in the border area between the two adjacent color areas of the at least one color pair, based on the previous determination, and the modified imaging parameters are stored.

It is a further aspect of the present invention to provide a method for enhancing the quality of a digital half tone image recorded on a substrate:

First, an output device is selected from at least one available output devices.

Then, quality enhancement information for the selected output device is read from at least one previously prepared quality enhancement information data.

During recording, the quality enhancement information for the selected output device is used to modify image data, thereby enhancing the quality of the recorded halftone image.

In one aspect of the present invention, the quality enhancement information for the selected output device includes screen parameters, such as halftone-dot rotation angle and/or screen resolution.

In another aspect of the present invention, using the quality enhancement information includes recording a latent or visible image with modified image data on a substrate.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

The present invention is a method that divides the imaging process into two distinctive parts: the "preparation stage" and the "production stage".

The preparation stage, typically, is an offline process, independent in time and place from the actual printing operation. The production stage includes the actual printing operation and is, therefore, time and device specific It will be appreciated that the present invention enables a marketing campaign to use the same original image, with several variations in size, color and resolution, for a newspaper ad, a magazine insert, a catalog and a billboard. Each form of the image can be printed by different printing technologies such as offset, Flexo, Inkjet and Xerography.

Figure 3:
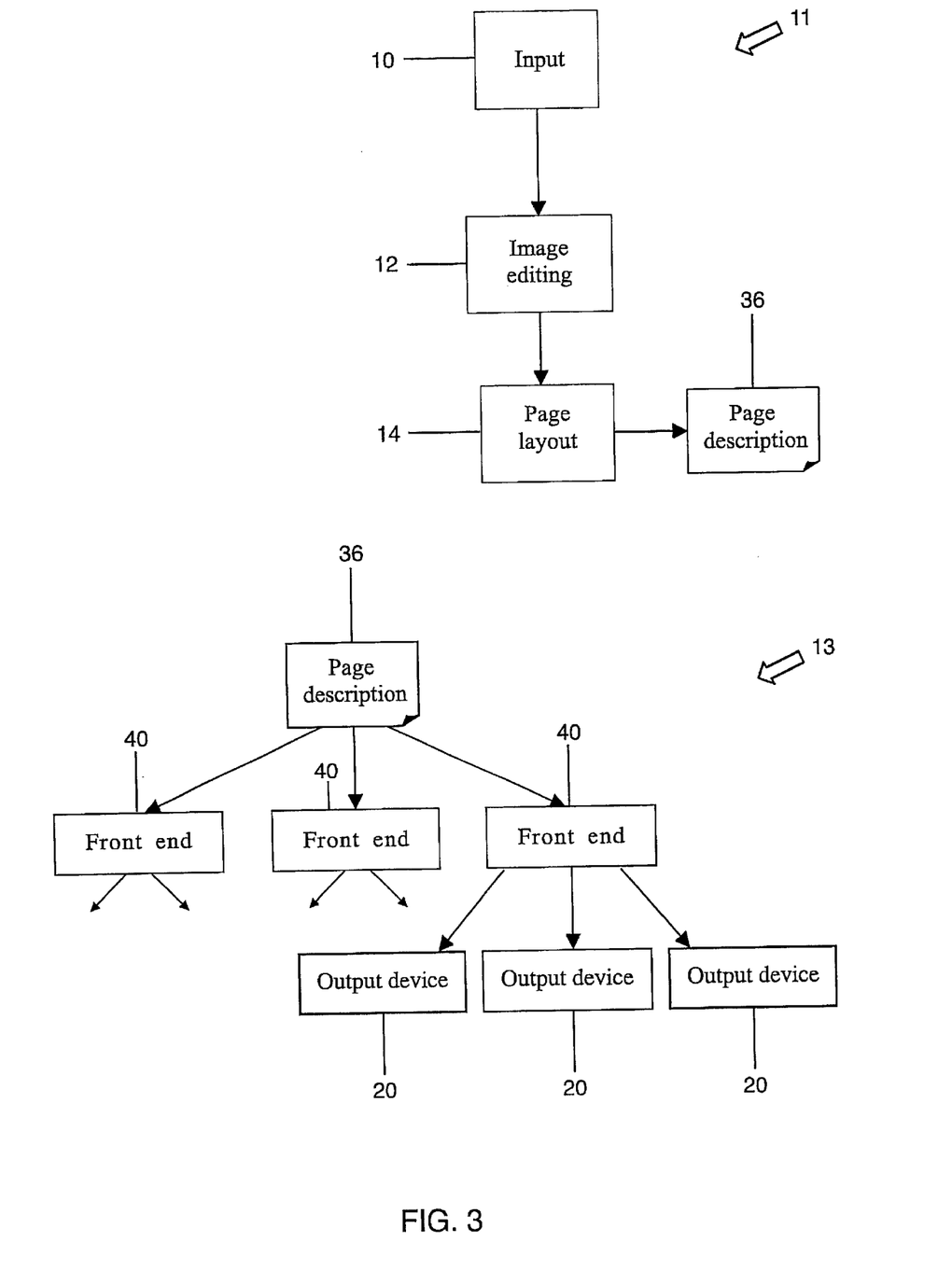
FIG. 3 is a schematic block diagram of a pre-press to press workflow, where the prepress process is separate from the imaging process.

FIG. 3 schematically outlines the separation of pre-press to press workflow into two parts. The first part, the prepress process, generally denoted by 11, is the creative part of the process, comprising inputting (step 10) the page elements, editing (step 12) individual images and defining (step 14) a page comprising those elements, according to a page layout scheme. The prepress process terminates with a page description file 36, preferably described in some standard Page Description Language, such as PostScript, provided by Adobe Systems Inc. of San Jose, Calif.

The second part, the imaging process, generally denoted by 13, receives the page description file 36 as input. The same page description file could be supplied to several front-end stations 40, in various locations, using any prevailing mode of communication. In addition, each front-end station can be connected to different types of output devices 20, or to several output devices of the same type.

The division of the imaging stage according to the present invention, where the identity of the actual output device may be unknown during significant parts of the process, encourages a new approach to the image-processing operations which must be performed on a page between the page definition stage and the actual output. These operations include, for example, color conversions—i.e. from RGB to CMYK—trapping, anti-aliasing and screening. Accordingly, the present invention provides new methods for the image-processing operations that are stimulated by the abutting of two color areas with a color value difference bigger than a predetermined threshold. The difference in value may be relevant to any two adjacent color areas within one separation of the image (when the eventual output will take place on a xerographic printer) or to combinations of specific color separations of these adjacent color areas (when the intended output device is a color press such as an offset press or a gravure press). The presence of two such neighboring color areas can cause artifacts in the final printed output, in the form of apparent misregistration in offset printing, or in the form of either misregistration, trailing edge deletion (TED) or leading edge deletion (LED) effects in xerographic printing.

Figure 4A:
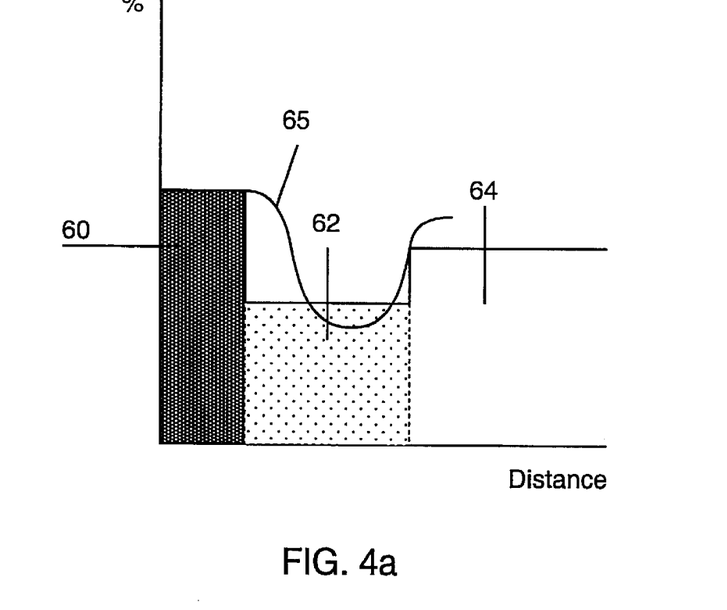
FIG. 4A is a schematic illustration of a trailing edge deletion problem in xerographic printing.

FIG. 4A is a schematic representation of the trailing edge deletion phenomenon. The areas denoted by 60, 62 and 64 are three adjacent areas in one separation of the image, which have different dot-percent values. Area 60 has the highest dot percent value and area 62 has the lowest dot percent value.

In the xerographic process, each pixel location is charged in proportion to its value. Neighboring pixels may have different values in the digital file, therefore requiring different electrical charge levels. For example, to achieve the transition from color 60 to color 62, a relatively big transition in charge is required.

Line 65 represents the actually printed dot percent, an effect caused by the inability of the electrical charges to make the necessary transition in the required short time (one pixel time). Therefore, the transition will be gradual, along line 65, causing a halo-like effect on the printed output. It will be appreciated that the bigger the difference in separation value between adjacent colors, the more noticeable will be the halo effect. The effect will also be more noticeable in the black separation than in other separations.

Figure 4B:
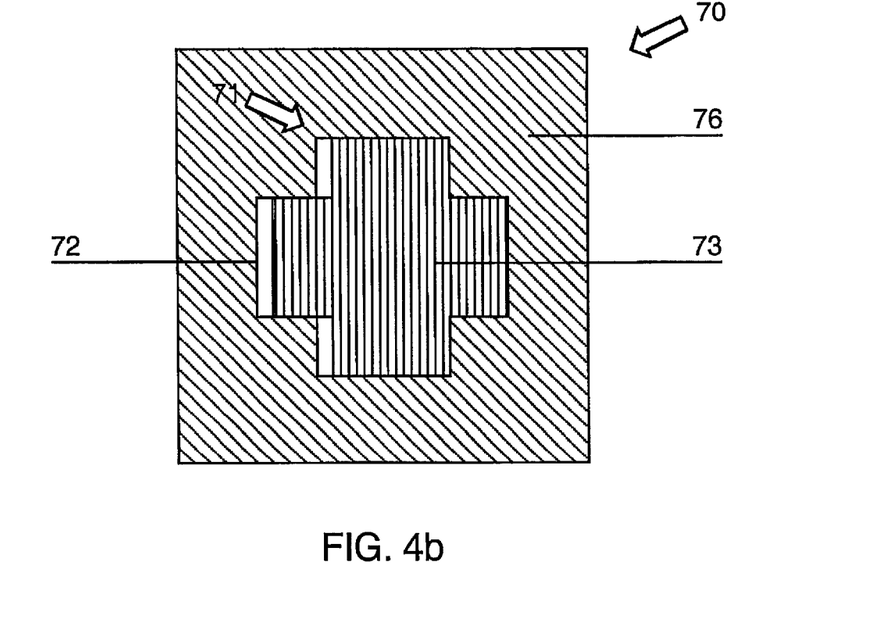
FIG. 4B is a schematic illustration of a misregistration problem in offset printing.

FIG. 4B is a schematic representation of the misregistration effect. In this example, page 70 includes background 76 and pattern 71, printed in, say, four process colors (C, M, Y, K). Misregistration in the printing of separation 73 will result in a strip 72, having the width of the misregistration and a color formed of the separation values of the other separations in the same area. It will be appreciated that the bigger the contrast between separation values of the adjacent colors, the more noticeable will the misregistration strip be.

Figure 5:
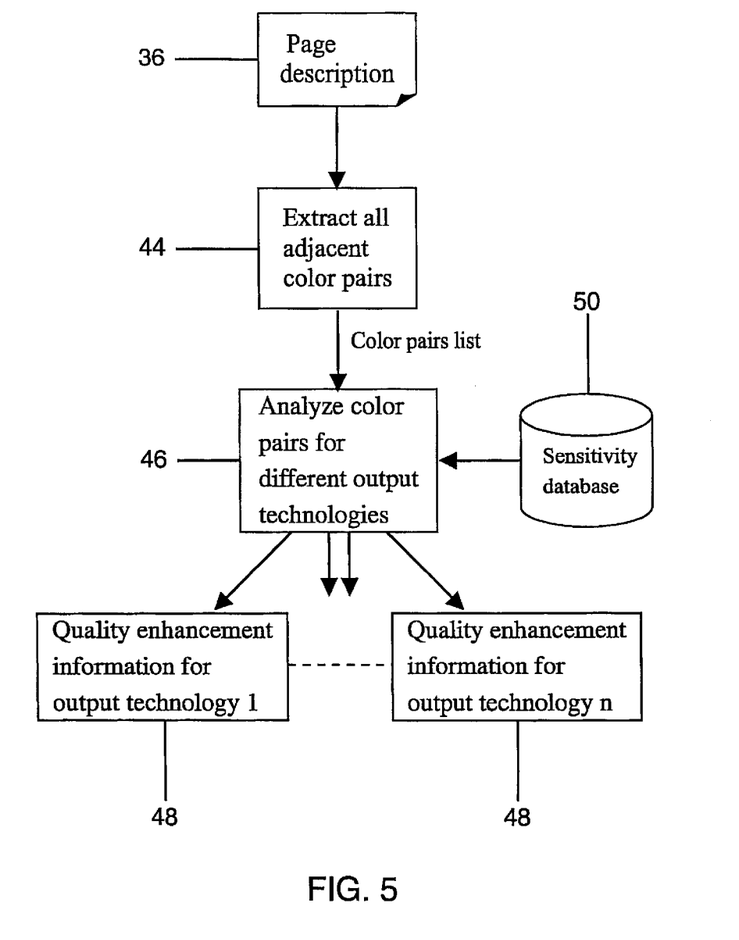
FIG. 5 is a schematic block diagram of an analysis stage of the workflow of the present invention.

Reference is now made to FIG. 5 which describes the preparation stage of the process of the present invention. As mentioned hereinabove, the preparation stage is performed anywhere in time and place between the generation of the page description file and the actual printing. It is independent of the output device and therefore can be performed only once, early in the process, preferably following step 14 of FIG. 3, and to suit all subsequent printing options of the same page.

Thus, the preparation stage of the present invention may be performed at the end of the prepress process or, alternatively, in the front end.

The input to the preparation stage is a page description file, preferably but not necessarily described in some standard page description language. In step 44, the process scans the color data of the page for adjacent color areas with different color values. The output of step 44 is a comprehensive list of all color pairs complying with this criterion, along with their coordinates on the page. In step 46, an analysis of the color-pair list is performed. Step 46 uses previous knowledge, e.g. a database 50, of the sensitivity of different output technologies, such as xerography or offset, to color variations, as described in conjunction with FIGS. 4A and 4B. Using this knowledge-base, the process of step 46 analyzes the list produced in step 44 to produce one or more lists, or files, indicating where on the printed page a quality problem is expected to happen, and suggesting the best mode of preventing the problem for each specific output technology, The output of step 46 is one or more quality enhancement lists 48, or files, one per potential output technology.

The analysis for offset printing will use particular criteria to define its quality enhancement list. An exemplary analysis and criteria is provided in U.S. Pat. No. 5,113,249, 5,323, 248, 5,420,702 and 5,481,379 to the present assignee, the contents of which are incorporated herein by reference. The analysis for xerography looks for a 'significant enough' e.g. 20% difference, in dot percent values between the two members of the candidate pair in at least one separation.

Figure 6A:
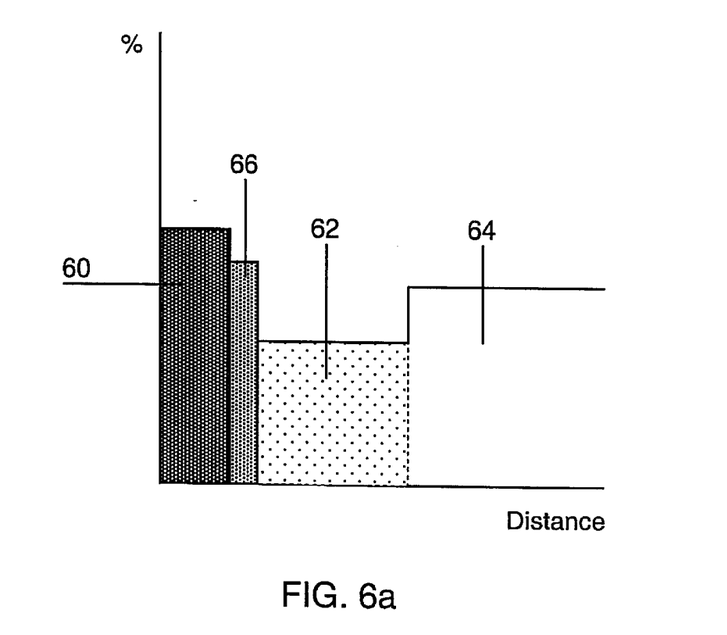
FIG. 6A is a schematic illustration of a solution to the trailing edge deletion problem of FIG. 4A using the workflow of the present invention.

Reference is now made to FIG. 6A, which illustrates one possible method to correct the artifacts. In this method, a new color element 66 is inserted between significantly different, adjacent colors 60 and 62. New color element 66 has a dot percent value that is an average of the dot percents of the two colors 60 and 62. New color element 66 reduces the color difference to one that does not create a problem.

The correction of FIG. 6A might be suggested in the quality enhancement file 48 created for xerographic printing in the following manner:

Pair#i (60; 62)

New area dot %=[% (60)−%(62)]*factor+%(62)

New area width=function (file resolution, device resolution)

where 'factor' is predefined.

Figure 6B:
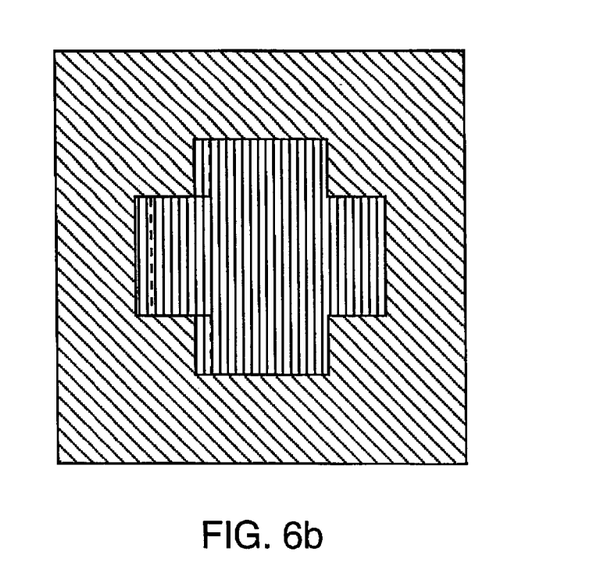
FIG. 6B is a schematic illustration of a solution to the misregistration problem of FIG. 4B.

Reference is now made to FIG. 6B, which indicates a correction for the misregistration case by creating a new frame between the pattern 71 and the background 76. The correction of FIG. 6B might be suggested in the quality enhancement file 48 created for offset printing in the following manner:

Pair#i (color A; color B)

New Area dot %=C %: Max(C % of A, C % of B), M %: Max(M % of A,

M % of B), Y %: Max(Y % of A, Y % of B),

K %: Max(K % of A, K % of B)

New area width=function (misregistration width, file resolution, device resolution)

Frame direction=½A & ½B where color A is the color of pattern 71, color B is the color of background 76 and the misregistration width is a machine dependent parameter supplied by the operator or read from a database. The frame direction in the above example indicates that the frame will be evenly spread between the two color areas A and B.

This method of correction is also discussed in the above-mentioned US patents.

Figure 7:
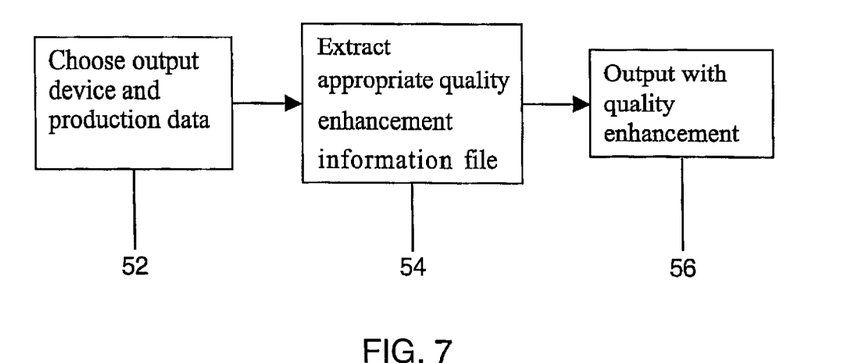
FIG. 7 is a schematic block diagram of an output stage of the workflow of the present invention.

Reference is now made to FIG. 7 which describes the production stage of the process of the present invention, preferably performed as late as possible in the printing process and typically during the actual output operation. In step 52, the output device for the specific job is specified and the production data e.g. percentage of enlargement, printing resolution and screening parameters, are specified by the operator.

In step 54, the quality enhancement file for the appropriate output technology, prepared in step 46 of FIG. 5, is chosen. This choice can be made automatically, using one of many programming techniques. One exemplary technique cross-references between the names of output device, types and quality enhancement file names.

The actual quality enhancement performed during output 56 can follow the corrections prepared in file 48, but alternately, the operator might choose to override some of the suggestions and/or implement additional improvements, depending on the specific output device and production data that have been selected. For example, the width of the trap created to prevent the misregistration effect can be either a system constant, in which case it will be incorporated in the quality enhancement file and executed accordingly, or it could be calculated during the production stage, taking into consideration the actual percentage of enlargement.

To demonstrate the use of such a late determination of the frame width, assume that the file is to be printed with a relatively large percent of enlargement. If the frame width is to be enlarged proportionally, the trap might cause another kind of artifact, namely, become too visible. Therefore, it might be in the operator's interest to avoid enlarging the frame. Alternatively, if the file is being reduced, the operator might be interested in reducing the trap width proportionally, for similar reasons.

Another type of quality enhancement is the modification of screen parameters. These parameters include screen dot size, shape, angle and location.

Figure 8A:
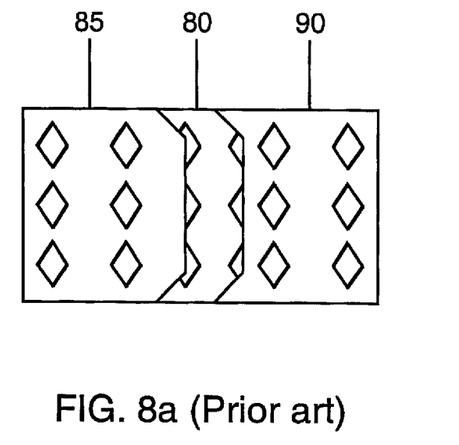
FIGS. 8A and 8B are a non-limiting example of screening parameters for localized image quality enhancement.
Figure 8B:
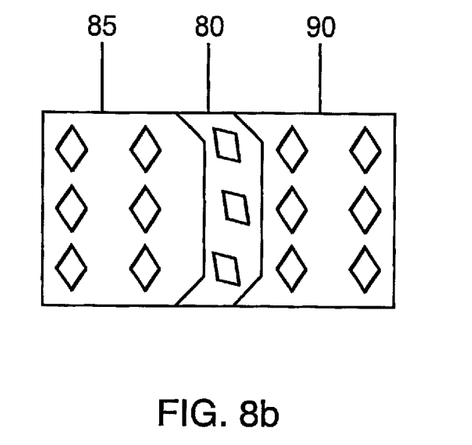

FIGS. 8A and 8B illustrate a frame 80, created between color areas 85 and 90. The screening process creates half-tone dots representing each separation value of each of the color areas. Since frame 80 is thin, the screen dots in FIG. 8A are broken, and create jagged edges to the frame. U.S. Pat. Nos. 5,691,828, 5,699,174 and 5,742,743 to the present assignee describe a method to rotate the dots of frame 80 only, to reduce the jagged edges. The result is shown in FIG. 8B.

Figure 9:
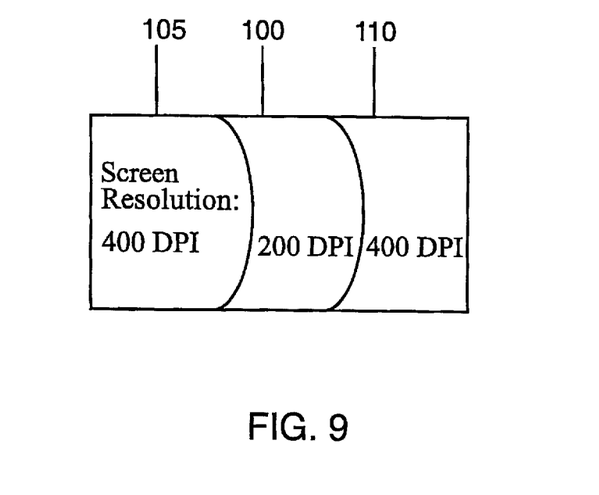
FIG. 9 is another non-limiting example of screening parameters for localized image quality enhancement.

FIG. 9 illustrates another output device dependent quality enhancement where the imaging resolution near the area between two adjacent color areas is changed. Trap area 100, created between two adjacent color areas 105 and 110, is assigned a different screening resolution from that of the adjacent areas. This change of resolution is possible with an imaging device that has the capability to image in different resolutions in given areas, e.g. 200 and 400 dpi, such as the DocuColor 40 PRO, available from Xerox Corporation, of Stamford, Conn.

In the course of preparing the quality enhancement parameters for an output device having this characteristic, specific borders can be marked for imaging in lower resolution, without assigning them a new color. When the imaging device encounters such a border in the course of imaging, it reduces the resolution of imaging to e.g. one half of the regular one. This causes the actual color of this area to be the average of the two abutting colors, since each pixel of the low resolution area consists of data from several (e.g. two) original pixels. In effect, this method is the same as that shown in FIG. 6A, e.g. inserting an intermediate color 66 between colors 60 and 62.

It will be appreciated by persons skilled in the art that the present invention is not limited by what has been particularly shown and described herein above. Rather the scope of the invention is defined by the claims that follow.

What is claimed is:

1. A method comprising the steps of:

identifying in a digital half-tone image at least one color pair comprising two adjacent color areas, wherein there is a difference in color value between said two adjacent color areas in at least one separation of said digital image; and for more than one output device:

determining for at least one pair of said at least one color pair whether quality enhancement is desired, based on pre-determined criteria that are output device dependent; and when quality enhancement is desired, preparing imaging parameters for modifying said digital image in a border area between said two adjacent color areas; and using said prepared imaging parameters to modify said digital image in the border area between said two adjacent color areas, thereby enhancing the quality of said recorded half tone image.

2. The method of claim 1 wherein said step of identifying is performed only once and said step of determining is performed once for each output device.

3. The method of claim 1 wherein said step of determining also comprises the step of specifying the type of quality enhancement desired for said at least one color pair.

4. The method of claim 1 wherein said step of preparing imaging parameters is output device independent.

5. The method of claim 1 wherein said step of preparing imaging parameters is output device dependent.

6. The method of claim 1 wherein said imaging parameters are screening parameters.

7. The method of claim 6 wherein said screening parameters include at least one of the following group: halftone dot rotation angle and screen resolution.

8. The method of claim 1 wherein said step of preparing imaging parameters comprises the step of decreasing a screen resolution parameter for said border area between said adjacent color areas.

9. The method of claim 1 wherein said step of using comprises the step of recording a latent image with said modified image data on a substrate.

10. The method of claim 1 wherein said step of using comprises the step of recording a visible image with said modified image data on a substrate.

11. A method of preparing information for recording a digital quality enhanced half tone image on a substrate, the method comprising the steps of:

identifying in said digital image at least one color pair comprising two adjacent colors, wherein there is a difference in color value between said two adjacent color areas in at least one separation of said image; and for more than one output device:
determining for at least one pair of said at least one color pair whether quality enhancement is desired, based on pre-determined criteria that are output device dependent; and
when quality enhancement is desired, preparing imaging parameters for modifying said image in the border area between the two adjacent color areas of said at least one color pair.

12. The method of claim 11 and also comprising the step of storing said imaging parameters.

13. The method of claim 11 wherein said step of identifying is performed only once and said step of determining is performed once for each output device.

14. The method of claim 11 wherein said step of determining also comprises the step of specifying the type of quality enhancement desired for said at least one color pair.

15. The method of claim 11 wherein said step of preparing imaging parameters is output device independent.

16. The method of claim 11 wherein said step of preparing imaging parameters is output device dependent.

17. The method of claim 11 wherein said imaging parameters are screening parameters.

18. The method of claim 17 wherein said screening parameters include one of the following: halftone dot rotation angle and screen resolution.

19. The method of claim 11 wherein said step of preparing imaging parameters comprises the step of decreasing a screen resolution parameter for said border area between said adjacent color areas.

20. A method of enhancing the quality of a digital half tone image recorded on a substrate, the method comprising the steps of:

selecting an output device from one or more available output devices;

reading quality enhancement information for said selected output device from more than one previously prepared output device dependent quality enhancement information; and during recording, using said quality enhancement information for said selected output device to modify data of said image, thereby enhancing the quality of said recorded halftone image.

21. The method of claim 20 wherein said quality enhancement information includes screening parameters.

22. The method of claim 21 wherein said screening parameters include one of the following: halftone dot rotation angle and screen resolution.

23. The method of claim 20 wherein said step of using comprises the step of recording a latent image with said modified image data on a substrate.

24. The method of claim 20 wherein said step of using comprises the step of recording a visible image with said modified image data on a substrate.

* * * * *